(12) United States Patent
Sender et al.

(10) Patent No.: US 9,948,572 B2
(45) Date of Patent: Apr. 17, 2018

(54) INTERNET OF THINGS APPLICATION FRAMEWORK

(71) Applicant: Verizon Patent and Licensing Inc., Arlington, VA (US)

(72) Inventors: Thierry R. Sender, New York, NY (US); Michael G. Hogan, Sussex, NJ (US); Pramod Kalyanasundaram, Acton, MA (US); Jianxiu Hao, Acton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 371 days.

(21) Appl. No.: 14/925,220

(22) Filed: Oct. 28, 2015

(65) Prior Publication Data
US 2017/0126577 A1    May 4, 2017

(51) Int. Cl.
  *H04L 12/911*    (2013.01)
  *H04L 29/08*     (2006.01)
  *H04W 4/02*      (2018.01)
  *H04W 8/18*      (2009.01)

(52) U.S. Cl.
  CPC ............ *H04L 47/70* (2013.01); *H04L 67/306* (2013.01); *H04L 67/34* (2013.01); *H04W 4/02* (2013.01); *H04W 8/18* (2013.01)

(58) Field of Classification Search
  CPC ....... H04L 47/70; H04L 67/306; H04L 67/34; H04W 4/02; H04W 8/18
  See application file for complete search history.

(56) References Cited

U.S. PATENT DOCUMENTS

2016/0205106 A1* 7/2016 Yacoub ............... H04L 61/1511
                                                   726/28
2016/0285979 A1* 9/2016 Wang .................. H04L 67/16

* cited by examiner

*Primary Examiner* — Kim T Nguyen

(57) ABSTRACT

A method, a device, and a non-transitory storage medium provides to receive a packet from an Internet of Things (IoT) device, wherein the packet carries IoT data; determine whether the packet carries IoT data; determine a type of linked data to obtain in response to a determination that the packet carries the IoT data, wherein a determination of the type of linked data is based on an application programming interface (API) identifier that identifies an API and corresponding type of linked data; obtain the type of linked data in response to the determination of the type of linked data; store the type of linked data and the IoT data; and grant access and use of the type of linked data and the IoT data to the API of a software application, when the software application is executed.

20 Claims, 10 Drawing Sheets

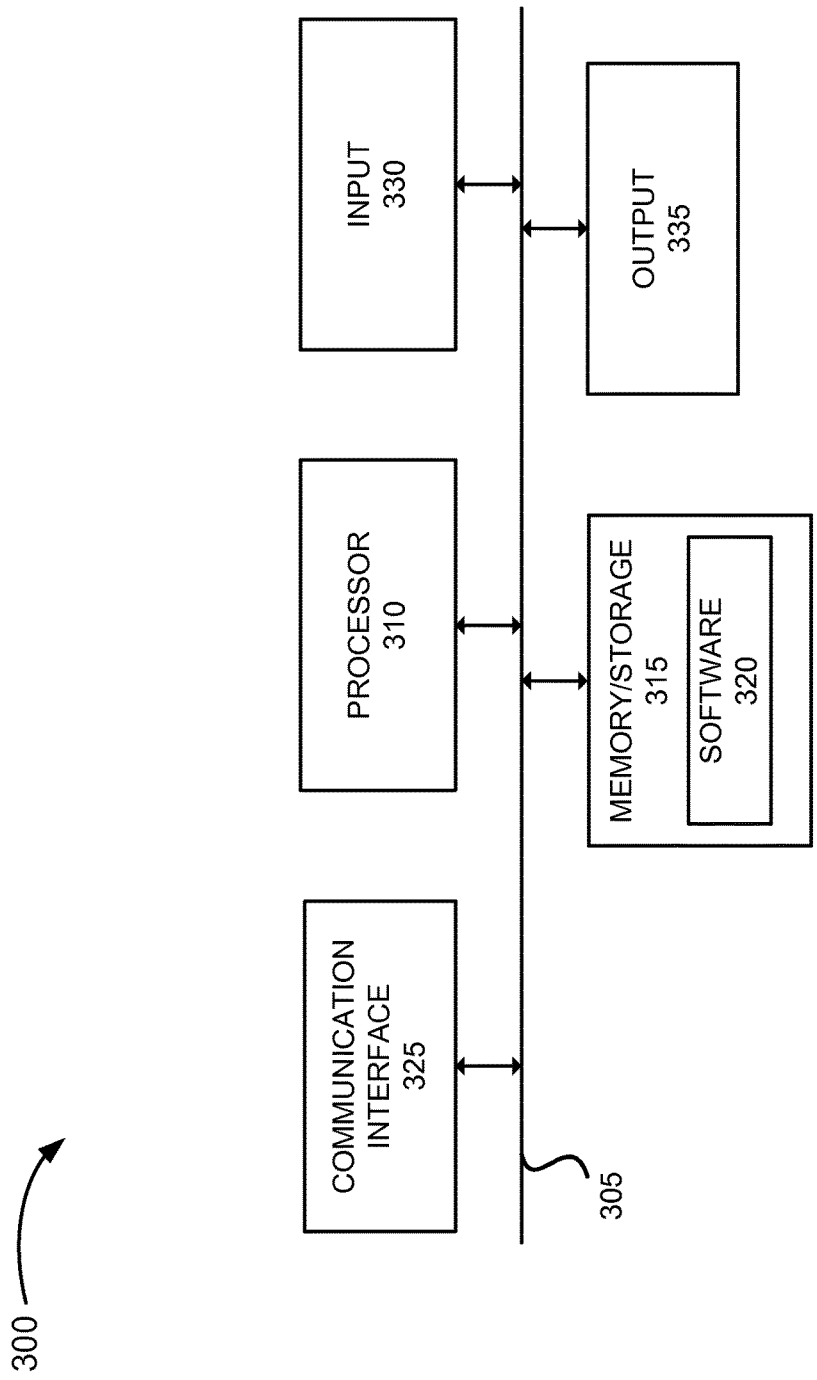

INTERNET OF THINGS APPLICATION FRAMEWORK

BACKGROUND

Internet of Things (IoT) technology refers to a wide range of devices that can collect data. The devices may be configured to transfer the data via a network. Since IoT technology has nearly limitless applications that can be leveraged to form new and useful services, interest among service providers and developers in IoT technology continues to increase.

BRIEF DESCRIPTION OF THE DRAWINGS

FIG. 3 is a diagram illustrating exemplary components of a device that may correspond to the network elements and an end device depicted in the environment of FIG. 1;

DETAILED DESCRIPTION OF PREFERRED EMBODIMENTS

Figure 1:
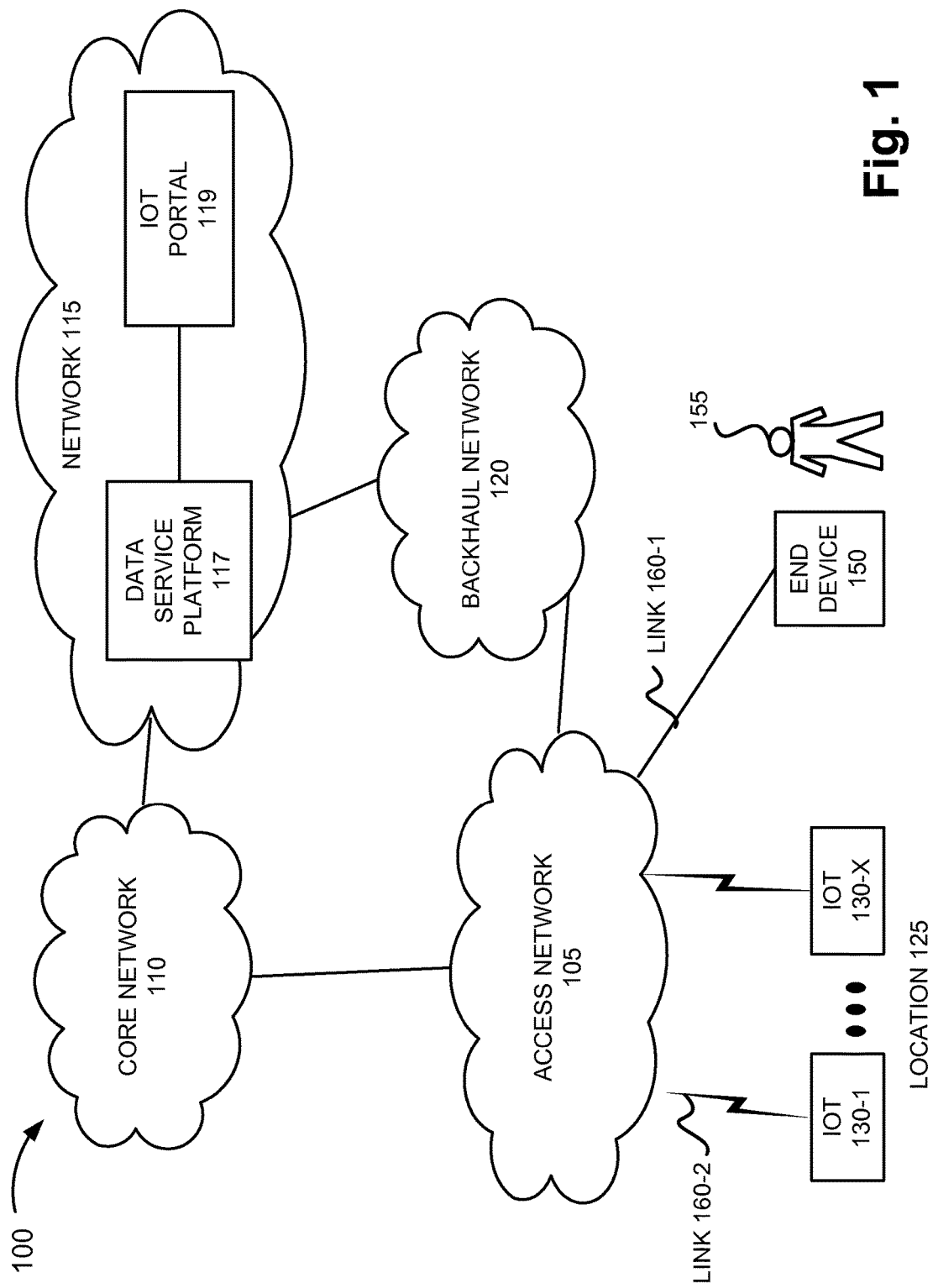
FIG. 1 is a diagram illustrating an exemplary environment in which an exemplary embodiment of an IoT software application development service of an IoT application framework may be implemented.

The following detailed description refers to the accompanying drawings. The same reference numbers in different drawings may identify the same or similar elements. Also, the following detailed description does not limit the invention.

According to an exemplary embodiment, an IoT application framework provides an IoT device service. According to an exemplary embodiment, the IoT device service is provided based on an IoT modem. An IoT device that includes the IoT modem is able to connect to a wireless network. According to an exemplary implementation, the IoT modem can connect to a Long Term Evolution (LTE) and/or an LTE-Advanced (LTE-A) network based on a control channel of an LTE specification (e.g., a non-access stratum (NAS) control channel). The IoT modem can transmit data to the wireless network and receive data from the wireless network via the control channel. In this way, the IoT device service may support an IoT management service, an IoT data service, and an IoT software application development service provided by the IoT application framework.

According to an exemplary embodiment, the IoT application framework provides the IoT management service. The IoT management service allows a user to configure, issue commands, monitor, update, etc., the IoT device. According to an exemplary embodiment, the IoT management service is provided based on a backend system of the IoT application framework.

According to an exemplary embodiment, the IoT application framework provides the IoT data service. According to an exemplary embodiment, the IoT data service includes a data linking service. The data linking service links IoT data transmitted by the IoT device with additional data (referred to herein as "linked data"). For example, the linked data may include network data, metadata, and user account data (e.g., user account data pertaining to a user of a mobile phone service). The data linking service may aggregate the IoT data with the linked data (referred to herein as "aggregated data"). The data linking service publishes the aggregated data based on a publication service. In this way, the aggregated data is made available to an IoT software application development service. According to an exemplary embodiment, the IoT data service is provided based on the backend system of the IoT application framework.

According to an exemplary embodiment, the IoT application framework provides an IoT software application development service. The IoT software application development service provides access to and use of application programming interfaces (APIs). These APIs may be used by a user to develop a software application. As an example, the user may wish to develop a software application that identifies real-time traffic conditions based on IoT devices associated with public facilities (e.g., traffic lights, etc.). The software application may use an API to hook into the IoT data, the linked data, and/or aggregated data so as to provide the traffic service. In this regard, the IoT software application development service is based on the IoT device service, the IoT management service, and the IoT data service.

According to an exemplary embodiment, the IoT software application development service provides software development kits (SDKs) that assist the user to develop the software application. Additionally, the IoT software application development service also provides a sample software application that illustrates how the APIs work, which may assist the user during the development and testing stage. According to an exemplary implementation, the software application may be a server-side software application and/or an end user-side software application. According to an exemplary embodiment, the IoT software application development service is provided based on the backend system of the IoT application framework.

FIG. 1 is a diagram illustrating an exemplary environment 100 in which an exemplary embodiment of the IoT software application development service of the IoT application framework may be implemented. As illustrated, environment 100 includes an access network 105, a core network 110, a network 115, and a backhaul network 120. Network 115 includes network elements. The network elements in network 115 include a data service platform 117 and an IoT portal 119. Environment 100 also includes a location 125. Location 125 includes network elements. The network elements in location 125 include IoT devices 130-1 through 130-X (also referred to as collectively as IoT devices 130 and, individually or generically as IoT device 130). Environment 100 further includes an end device 150 and a user 155. For purposes of description, end device 150 is not considered a network element and is not considered a part of the IoT application framework.

As further illustrated, environment 100 includes communicative links between the network elements, networks, and end device 150 (although only two are referenced in FIG. 1 as a links 160-1 and 160-2). A network element may transmit and receive data via link 160. Similarly, end device 150 may transmit and receive data via link 160. Environment 100 may be implemented to include wireless and/or wired (e.g., electrical, optical, etc.) links 160. A communicative connection between network elements and between end device 150 and a network element may be direct or indirect. For example, an indirect communicative connection may involve an intermediary device or network element, and/or an intermediary network not illustrated in FIG. 1. Additionally, the number, the type (e.g., wired, wireless, etc.), and the arrangement of links 160 illustrated in environment 100 are exemplary.

A network element may be implemented according to a centralized computing architecture, a distributed computing architecture, or a cloud computing architecture (e.g., an elastic cloud, a private cloud, a public cloud, etc.). Additionally, a network element may be implemented according to one or multiple network architectures (e.g., a client device, a server device, a peer device, a proxy device, and/or a cloud device).

The number of network elements, the number of end devices, the number of networks, and the arrangement in environment 100 are exemplary. According to other embodiments, environment 100 may include additional network elements, fewer network elements, and/or differently arranged network elements, than those illustrated in FIG. 1. Additionally or alternatively, in some instances, there may be only a single IoT device 130 at location 125. Additionally or alternatively, for example, there may be multiple end devices 150, data service platforms 117, and so forth.

Additionally, or alternatively, according to other embodiments, multiple network elements may be implemented on a single device, and conversely, a network element may be implemented on multiple devices. Additionally, or alternatively, environment 100 may include an additional network and/or arrangement of networks that is different from that illustrated in FIG. 1. For example, access network 105 may be connected to another network (not illustrated). The other network may include other network elements (not illustrated). Additionally, or alternatively, one network may be combined with another network. For example, core network 110 and network 115 may be combined into a single network.

Also, according to other embodiments, one or more functions and/or processes described as being performed by a particular network element may be performed by a different network element or some combination of network elements, which may or may not include the particular network element.

Access network 105 includes one or multiple networks of one or multiple types. For example, access network 105 may be implemented to include a terrestrial network, a satellite network, a wireless network, and/or a wired network. According to an exemplary implementation, access network 105 includes a radio access network (RAN). The RAN may be a 3rd Generation (3G) RAN, a 3.5G RAN, a Fourth Generation (4G) RAN, a 4.5G RAN, a future generation wireless network architecture, etc. By way of further example, access network 105 may include an Evolved UMTS Terrestrial Radio Access Network (E-UTRAN) of a Long Term Evolution (LTE) network or LTE-Advanced (LTE-A) network, a U-TRAN, Universal Mobile Telecommunications System (UMTS) RAN, a Global System for Mobile Communications (GSM) RAN, a Wideband Code Division Multiple Access (WCDMA) RAN, an Ultra Mobile Broadband (UMB) RAN, a High-Speed Packet Access (HSPA) RAN, an Evolution Data Optimized (EV-DO) RAN, or the like. Depending on the implementation, access network 105 may include various network elements, such as a base station (BS), a Node B, an evolved Node B (eNB), a BS controller, a radio network controller (RNC), a femto device, a pico device, a home eNB, a relay node, a wireless access point, or other type of wireless node that provides wireless access. Access network 105 may include a wired network. For example, access network 105 may include an optical network or a cable network.

Core network 110 includes one or multiple networks of one or multiple types. For example, core network 110 may be implemented to include a terrestrial network, a satellite network, a wireless network, and/or a wired network. According to an exemplary implementation, core network 110 includes a complimentary network pertaining to the one or multiple RANs described above. For example, core network 110 may include the core part of an LTE network, an LTE-A network, etc. Depending on the implementation, core network 110 may include various network elements, such as a gateway, a support node, a serving node, a router, a switch, a bridge, as well other network elements pertaining to various network-related functions, such as billing, security, authentication and authorization, network polices, subscriber profiles, etc.

Network 115 includes one or multiple networks of one or multiple types. For example, network 115 may include the Internet, the World Wide Web, an Internet Protocol (IP) Multimedia Subsystem (IMS) network, a cloud network, a wide area network (WAN), a metropolitan area network (MAN), a service provider network, a private IP network, some other type of backend network, and so forth. As illustrated, according to an exemplary embodiment, network 115 includes a data service platform 117 and an IoT portal 119. According to other exemplary embodiments, data service platform 117, IoT portal 119, and/or a portion thereof may be implemented in core network 110.

Data service platform 117 includes a network device that provides advanced network services in addition to traditional services, such as Transport Control Protocol (TCP) optimization, traffic shaping, and traffic statistic collections. Additionally, data service platform 117 provides an IoT data service. The IoT data service includes receiving all packets that are transmitted by IoT devices 130. Upon receipt of the packets, the IoT data service inspects each packet, identifies data that can be linked to IoT data carried in a packet, retrieves the linked data, and aggregates the IoT data with the linked data. The aggregated data is made available to users 155 of IoT portal 119.

Figure 2A:
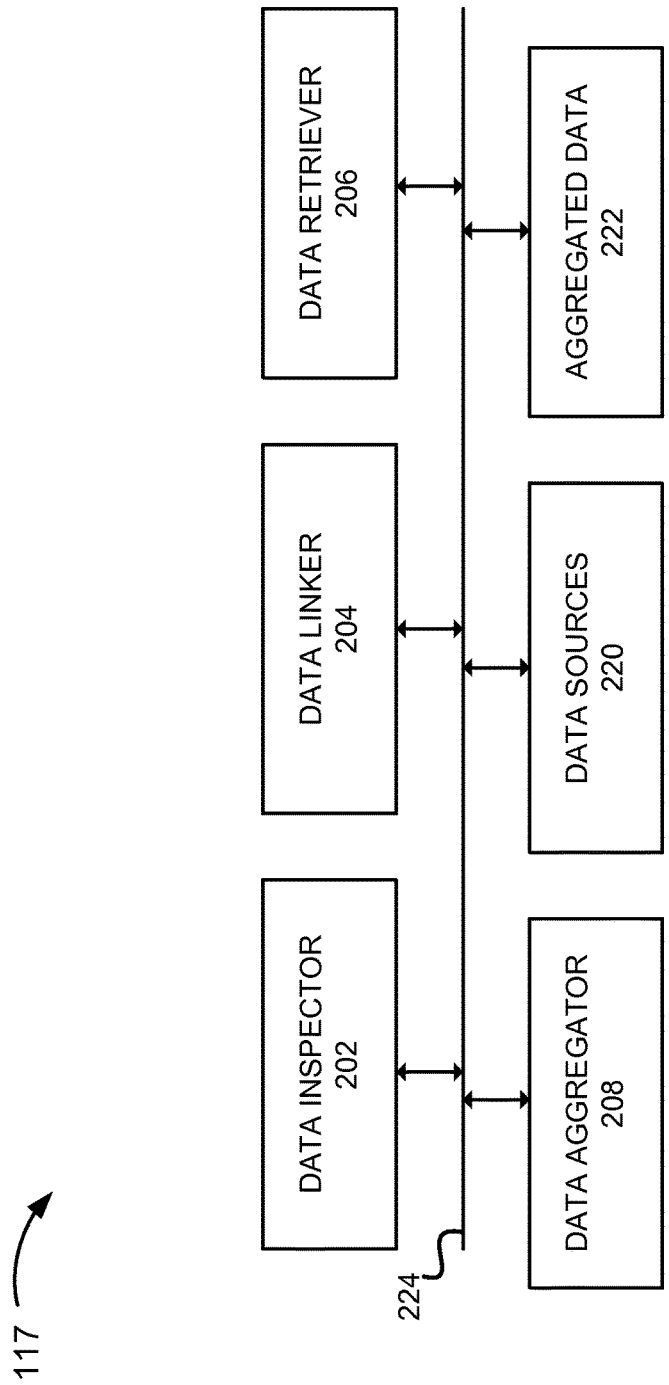
FIG. 2A is a diagram illustrating exemplary network elements of a data service platform depicted in the environment of FIG. 1.

FIG. 2A is a diagram of exemplary network elements of data service platform 117. As illustrated, data service platform 117 includes a data inspector 202, a data linker 204, a data retriever 206, and a data aggregator 208. Additionally, data service platform 117 includes data sources 220 and aggregated data 222. According to other exemplary embodiments, data service platform 117 may include additional, fewer, and/or different network elements than those illustrated in FIG. 2A and described herein. Data inspector 202, data linker 204, data retriever 206, data aggregator 208, data sources 220, and/or aggregated data 222 may be connected to and communicate with each other via a hardware link (e.g., a data bus, a system bus, a control bus), a software link (e.g., an application program interface (API), inter-process communication (IPC), etc.) or an inter-network device link (e.g., link 160) via a link 224.

According to an exemplary embodiment, data inspector 202 includes logic that identifies packets carrying IoT data. According to an exemplary implementation, data inspector 202 uses a packet inspection method. For example, data inspector 202 may perform deep packet inspection. As a result of the packet inspection, data inspector 202 obtains network protocol data (e.g., source Internet Protocol (IP) address, destination IP address) and, other header data (e.g., size of datagram, etc.), payload data (e.g., IoT data), a device identifier of IoT device 130, etc. Depending on the protocol stack used by IoT device 130 to transmit the IoT data, data inspector 202 may identify various types of data.

According to another exemplary implementation, data inspector 202 uses a packet filtering method. As a result of the packet filtering, data inspector 202 obtains network protocol data (e.g., source IP address, destination IP address) and/or other data (e.g., a device identifier of IoT device 130, etc.).

According to one exemplary implementation, when IoT device 130 is assigned a static IP address, data inspector 202 determines that the packet pertains to a particular IoT device 130 based on the static IP address. For example, in an LTE network or an LTE-A network, data service platform 117 may interface with various network elements of core network 110 (e.g., home subscriber server (HSS), packet data network gateway (PGW), mobility management entity (MME), etc.). According to one exemplary implementation, the HSS stores a subscriber profile pertaining to IoT device 130. The subscriber profile may include a static IP address, as well as other subscription data (e.g., a device identifier, etc.). By way of further example, in view of the address space afforded by IPv6, IoT device 130 may be assigned a static IPv6 address. Based on the subscriber profile, data inspector 202 may identify a packet pertaining to the particular IoT device 130. According to another exemplary implementation, data service platform 117 may locally store a database. The database may store subscriber profiles that include static IP addresses assigned to IoT devices 130 and other subscription data.

According to other implementations, when dynamic allocation of an IP address is used, the PGW may allocate an IP address to IoT device 130 based on an IP pool or through another device (e.g., Dynamic Host Configuration Protocol (DHCP) server, etc.). Data inspector 202 may acquire (e.g., via communication with the PGW and/or the DHCP server) the dynamically allocated IP address assigned to IoT device 130 and a device identifier of IoT device 130. Based on this information, data inspector 202 may identify a packet pertaining to the particular IoT device 130.

According to various implementations, IP address assignment relative to IoT device 130 may occur during initial attachment to access network 105 and core network 110 or subsequently in accordance with a communication standard (e.g., a 3GPP LTE standard, etc.). IoT device 130 may transmit an attachment request, which includes a device identifier pertaining to IoT device 130. IoT device 130 may be assigned an IPv6 address or an IPv4 address. Subsequent to assignment of the IP address, data inspector 202 of data service platform 117 may identify packets that pertain to a particular IoT device 130.

According to yet another exemplary implementation, data inspector 202 includes logic to identify IP addresses that are within a certain range that have been allocated to IoT devices 130.

According still other exemplary implementations, data inspector 202 includes logic to identify packets carrying IoT data based on a device identifier of IoT device 130. For example, as previously described, the IoT device service may use the IoT modem of IoT device 130 to transmit the packet via a NAS control channel. The packet carries a device identifier of IoT device 130. The device identifier may be stored in the subscriber profile as subscription data. Data inspector 202 may identify a packet pertaining to a particular IoT device 130 based on the device identifier.

According to an exemplary embodiment, data linker 204 includes logic to select a type of linked data to obtain based on the data identified and/or obtained by data inspector 202. For example, the identified and/or obtained data may include a source network address, a device identifier, and/or IoT data. As described above, linked data is intended to mean any data that supplements or augments the IoT data. The linked data may include various types of data. For example, the linked data may include timestamp data (e.g., time or date and time) pertaining to when the IoT data was transmitted by IoT device 130 and/or when the IoT data was received by data service platform 117, location data of IoT device 130 (e.g., longitude and latitude, a name of a place (e.g., a name of a restaurant, etc.), a street address, city, state, zip code), an IoT device identifier (e.g., an equipment identifier, a device name, etc.), a mobile phone number of IoT device 130, a user identifier associated with IoT device 130 (e.g., an International Mobile Subscriber Identity (IMSI) or the like), an IoT device 130 that is a neighbor or a part of a group of IoT devices 130 to which the transmitting IoT device 130 belongs, image data (e.g., for face recognition, image matching, pattern matching, etc.), and/or other metadata, such as environmental data (e.g., weather, etc.), contextual data (time, locale, events, etc., pertaining to IoT device 130/IoT data), advertisement data (e.g., products, services, etc., pertaining to the location of IoT device 130, etc.) that can be mapped to or correlate with IoT device 130 and/or linked data pertaining to IoT device 130 (e.g., metadata that can be linked to other linked data(e.g., location, time, etc.)).

Additionally, for example, a type of linked data may include IoT data obtained from an IoT device associated with another entity. As an example, the service provider of the IoT application framework may own, rent, rent to another party, manage, or operate one type of IoT device 130. User 155 of the IoT application framework may own, rent, manage, and/or operate his or her own and different type of IoT device 130. According to such an example, IoT data from IoT device 130 associated with the service provider may be used as linked data relative to the IoT data from IoT device 130 associated with the user 155.

According to an exemplary implementation, data linker 204 selects the type of linked data to obtain based on a subscriber profile. For example, user 155 may register with the IoT application framework and services via IoT portal 119 during which the subscriber profile is created. User 155 may select APIs, which provide access to and use of linked data, via the IoT software application development service of IoT portal 119. As previously described, the software application being developed may use the linked data to support a service. The subscriber profile may indicate certain types of linked data in support of the selected APIs. Data linker 204 may select the linked data based on the subscriber profile and/or other data obtained from data inspector 202 (e.g., source IP address, device identifier, etc.). Data linker 204 may instruct data retriever 206 as to the type of linked data to obtain relative to one or more packets inspected.

According to other exemplary embodiments, data linker 204 may be omitted. For example, data inspector 202 may pass the obtained data from data inspector 202 to data retriever 206. According such an embodiment, data retriever 206 may obtain all linked data that support the APIs offered by the IoT software application development service of IoT portal 119.

According to an exemplary embodiment, data retriever 206 includes logic to obtain the linked data from various sources, such as data sources 220. For example, data retriever 206 includes logic to search, perform lookups, query, etc., data sources 220 to obtain the linked data. Data retriever 206 may manage various connection pools, etc., relative to data sources 220.

Data sources 220 may include web servers, third party devices, network elements in core network 110 and/or access network 105, various databases, and so forth. For example, data sources 220 may include various servers that provide various types of linked data pertaining to weather, advertisements, user account information (e.g., HSS), etc. Since some linked data may change over time, data retriever 206 may update the linked data using well-known techniques (e.g., polling, etc). Data retriever 206 passes the obtained linked data to data aggregator 208.

According to an exemplary embodiment, data aggregator 208 includes logic to aggregate and store the IoT data with the linked data. Data aggregator 208 stores aggregated data 222 in a repository (e.g., a database, a data structure, etc.). Aggregated data 222 is made available to the selected APIs in support of a service offered by the software application. For example, data aggregator 208 may store aggregated data 222 in a dedicated database that is accessible to the software application. According to other exemplary embodiments, data aggregator 208 includes logic to store the linked data and the IoT data separately, which is made available to the selected APIs. That is, data aggregator 208 may not aggregate the IoT data with the linked data.

Referring back to FIG. 1, according to an exemplary embodiment, IoT portal 119 includes a network device that provides the IoT management service. A user (e.g., user 155) of the IoT application framework may manage (e.g., configure, issue commands, update, monitor, etc.) IoT devices 130 and other network elements (e.g., IoT data, linked data, aggregated data, etc.) via end device 150. IoT portal 119 may provide various IoT management services such that user 155 may manage on-the-fly and/or remotely. Additionally, IoT portal 119 may allow user 155 to manage in an automated manner based on a management schedule. For example, user 155 may configure a time schedule during which IoT configuration data (e.g., a software update) pertaining to one or multiple IoT devices 130 is/are updated.

According to an exemplary embodiment, IoT portal 119 includes a network device that provides an IoT software application development service. The IoT software application development service provides access to and use of APIs that may be used by user 155 to develop a software application. The software application may use an API to hook into the linked data or the aggregated data so as to provide a service afforded by the software application. The IoT software application development service also provides SDKs that assist user 155 to develop the software application for various end user devices. Additionally, the IoT software application development service also provides a sample software application that illustrates how the APIs work, which may assist user 155 during the development stage.

Figure 2B:
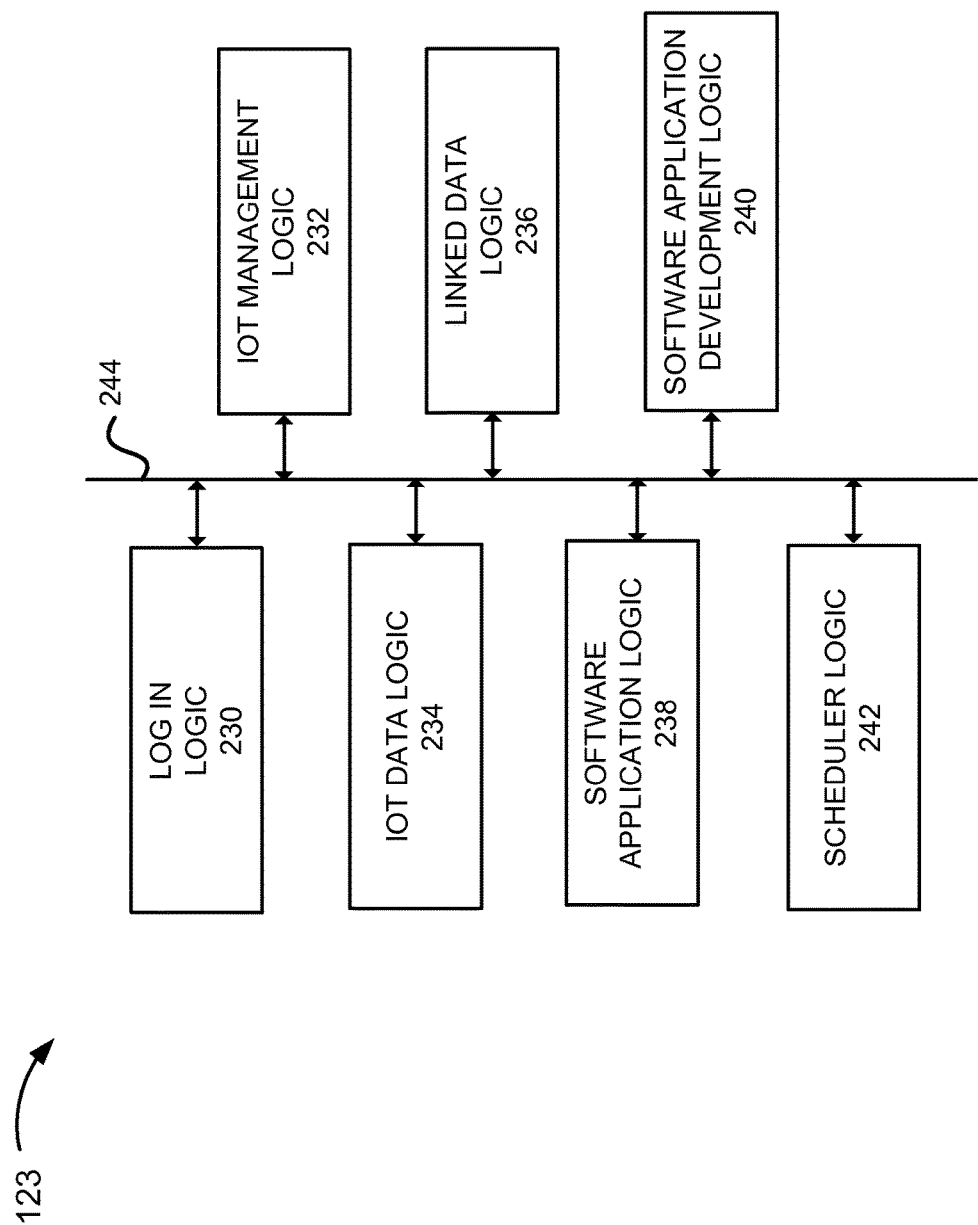
FIG. 2B is a diagram illustrating exemplary network elements of an IoT portal depicted in the environment of FIG. 1.

FIG. 2B is a diagram illustrating exemplary network elements of IoT portal 119. For example, as illustrated, IoT portal 119 includes log in logic 230, IoT management logic 232, IoT data logic 234, linked data logic 236, software application logic 238, software application development logic 240, and scheduler logic 242. According to other exemplary embodiments, IoT portal 119 may include additional, fewer, and/or different network elements than those illustrated in FIG. 2B and described herein. Log in logic 230, IoT management logic 232, IoT data logic 234, linked data logic 236, software application logic 238, software application development logic 240, and/or scheduler logic 242 may be connected to and communicate with each other via a hardware link (e.g., a data bus, a system bus, a control bus), a software link (e.g., an application program interface (API), inter-process communication (IPC), etc.) or an inter-network device link (e.g., link 160) via a link 244. Each of log in logic 230, IoT management logic 232, IoT data logic 234, linked data logic 236, software application logic 238, software application development logic 240, and scheduler logic 242 provides a graphical user interface that allows an IoT application framework service subscriber (e.g., user 155) to use the various services and perform various tasks as described herein.

According to an exemplary embodiment, log in logic 230 includes logic that provides a log in service. For example, log in logic 230 performs authentication and authorization. As an example, user 155 may enter a user name and a password, which is subsequently validated or not. Log in logic 230 may include an on-boarding process (e.g., registration, etc.) for a new user that includes configuration and assignment of user credentials. Log in logic 230 stores these user credentials and uses the user credentials for comparison when user 155 logs in. Log in logic 230 may also provide other well-known communication services pertaining to security, such as encryption, secure connection, and so forth. According to an exemplary embodiment, log in logic 230 also includes logic that manages and stores a subscriber profile. The subscriber profile may store data pertaining to various services offered via IoT portal 119.

According to an exemplary embodiment, IoT management logic 232 includes logic that provides an IoT management service pertaining to IoT devices 130. For example, user 155 may manage inventory data pertaining to IoT devices 130. By way of further example, the inventory data includes identifier data pertaining to each IoT device 130 (e.g., a name, an equipment identifier, a Media Access Control (MAC) address, etc.) and identifier data pertaining to the number of IoT devices 130 and/or a grouping of IoT devices 130 (e.g., by name, by location, etc). Additionally, for example, the inventory data includes attribute data, such as the type of IoT device 130 (e.g., a sensor, a video camera, etc.), a make and model of IoT device 130, and the like. Also, for example, the inventory data includes location data that indicates the location of IoT device 130 (e.g., XYZ store, GPS coordinate, etc.), location of a grouping of IoT devices 130, and so forth.

According to an exemplary embodiment, IoT management logic 232 includes logic that allows user 155 to configure the logic (e.g., executable software) at IoT device 130, keep track of a version of the logic installed at IoT device 130, and update the logic at IoT device 130. User 155 may also control the state of IoT device 130. For example, user 155 may power up and power down IoT device 130 and monitor various states (e.g., battery replacement state (e.g., remaining life of battery), a failure state (e.g., boot-up failure, etc.), an active state (e.g., turned on or power on), an inactive state (e.g., turned off or power off), etc.). In this way, user 155 may identify maintenance issues, a non-functioning IoT device 130, and so forth. Depending on the type of IoT device 130, user 155 may issue commands to IoT device 130. For example, when IoT device 130 is a camera, user 155 may issue a command which causes the camera to pan left, pan right, zoom, etc.

According to an exemplary embodiment, IoT data logic 234 includes logic that provides a data management service pertaining to the IoT data. For example, user 155 may access and view the IoT data obtained from IoT device 130, set storage preferences pertaining to how the IoT data is stored (e.g., type of data structure (e.g., table, etc.), type of database (e.g., operational database, a relational database, etc.)), security preferences (e.g., data masking, etc.), and other aspects pertaining to data management.

According to an exemplary embodiment, linked data logic 236 includes logic that provides a data management service pertaining to the linked data. For example, user 155 may access and view the linked data obtained by data service platform 117, set storage preferences pertaining to how the linked data is stored (e.g., type of data structure (e.g., table, etc.), type of database (e.g., operational database, a relational database, etc.)), security preferences (e.g., data masking, etc.), and other well-known aspects pertaining to data management. According to an exemplary embodiment, linked data logic 236 includes logic that allows user 155 to set preferences pertaining to where the linked data is obtained. For example, user 155 may configure a Uniform Resource Identifier (URI) pertaining to a data source (e.g., data sources 220) from which data service platform 117 uses to obtain linked data.

According to an exemplary embodiment, software application logic 238 includes logic that provides a management service pertaining to the software application. For example, software application logic 238 allows user 155 to manage the software application, such as on-boarding an update to the software application, providing an over-the-air update service for updating the software application to end devices, and so forth.

According to an exemplary embodiment, software application development logic 240 includes logic that provides an IoT software application development service. For example, the IoT software application development service provides user 155 access to a catalog of APIs to use. These APIs may be used by user 155 to develop a software application. Given the array of various IoT devices 130 available and corresponding IoT data to be obtained, the catalog of APIs may be equally large. For example, IoT devices 130 may include parking lot sensors to collect parking information, road sensors to collect traffic information, cameras to capture images in public places, video cameras to capture video and audio in public places, location chips to collect location data pertaining to public transportation vehicles (e.g., busses, subways, trains, etc.), location chips to collect location data pertaining to government, city, public service vehicles (e.g.,), mobile phones to collect location data pertaining to the mobile phones and/or the end users, and so forth. Correspondingly, the APIs may provide user 155 access to and use of rich linked data that augments and enhances the IoT data obtained via IoT device 130. For example, the catalog of APIs may provide various sub-combinations of the linked data with the IoT data, as well as all the linked data available and the IoT data.

According to an exemplary embodiment, the APIs provide access to and use of IoT data, the linked data, and/or the aggregated data. The APIs may also specify certain operations to be performed in order to use a service and/or data offered by the data service platform 117. For example, an API may define and require a permission before providing access to data pertaining to an IoT device 130, an end device associated with an end user, and so forth.

According to an exemplary embodiment, the APIs include web service technologies (e.g., Simple Object Access Protocol (SOAP), Representational State Transfer (REST), Extensible Markup Language (XML), JavaScript Object Notation (JSON), etc.). Additionally, the APIs may also use other technologies such as dynamic link libraries (DLL) files in C/C++, Java Archive (JAR) files/Remote Method Invocation (RMI) in Java, and so forth.

According to an exemplary embodiment, the APIs include APIs pertaining to various services offered by the service provider of the IoT application framework, which may or may not necessarily be based on IoT devices 130 and/or IoT data. For example, the APIs may provide user 155 access to a video streaming service for an event (e.g., a sporting event, a concert, etc.) or a location (e.g., bars, restaurants, etc.); local information pertaining to bars, restaurants, parking lots, etc; a best route service that determines a best route to a location by taking into account current traffic conditions (e.g., traffic jams, accidents, construction, blocked lanes, no delays (e.g., unobstructed), etc.); a real-time traffic service that provides real-time traffic information and traffic maps; a parking lot service that provides parking lot information to enable end users to find available parking at the cheapest rate; a go-to service that allows end users to search to find various places (e.g., restaurants, gas stations, bars, theaters, etc.), as well as filter search results based on real-time information (e.g., restaurant is crowded, gas station offers gas at cheapest price, etc.); and an advertisement service (e.g., to push ads of various types depending on the location of an end user, etc.).

Provided below are examples of APIs that may be provided via IoT portal 119. For example, parking garage APIs provide APIs pertaining to parking garages.

API-1: garage information
    Input: <garage name>
    Output: <garage location, total capacity, percentage full, open hours, prices>
    API-2: nearest garage
    Input: <location of garage and, number of garages near garage or within x distance from garage>
    Output: <list of garages with location, total capacity, percentage full, open hours, prices>

According to another example, traffic APIs provide APIs pertaining to traffic.

API-1: street traffic information
    Input: <street name and city name>
    Output: <list of street links with traffic information: each link has (lat_1, long_1), miles/hour, starting point, end point, and traveling speed>
    API-2: street link traffic information
    Input: <street link: (lat_1, long_1)-(lat_2, long_2)>
    Output: <list of miles/hour and traveling speed>
    API-3: street links traffic information
    Input: <street link: (lat_1, long_1)-(lat_2, long_2) . . . >
    Output: <list of miles/hour and traveling speeds>
    API-4: Intersections or points traffic information for bridges, rotary or busy intersections
    Input: <list of points: (lat_1, long_1), (lat_2, long_2) . . . >
    Output: <list of miles/hour and traveling speeds>

According to yet another example, object activity APIs provide APIs pertaining to an object or a person.

API-1: following a phone number or a user
    Input: <phone number or a user identifier>
    Action: verify that requesting user has permission to view the requested information
    Output: <list of locations, images, or other activities>

API-2: following an image object
Input: <an image>
Action: perform image matching, pattern matching, or face recognition
Output: <list of images and locations matched>

According to still another example, viewing APIs provide APIs pertaining to viewing an image or a video.

API-1: Get list of cameras for a given location
Input: <an address or a GPS location (lat, long)>
Output: <list of camera IDs and names>
API-2: View camera
Input: <camera ID or name>
Output: <streaming video or images>

According to an exemplary embodiment, software application development logic 240 provides SDKs that assist user 155 to develop a software application. The SDKs include a set of development tools including, for example, a debugger, software libraries, APIs, documentation, sample code, tutorials, and so forth. The SDKs may provide these tools in an integrated development environment (IDE). The SDKs may allow user 155 to create software applications directed to various operating systems (e.g., Android, iOS, etc.). The software application may be a server-side software application and/or an end user-side software application. The SDKs provide access to and use of the services offered by data service platform 117 and the IoT data, the linked data, and/or the aggregated data.

Scheduler logic 242 includes logic that provides a scheduling service relative to the management services described herein. For example, user 155 may configure a schedule for a configuration to be performed. This is in contrast to a configuration being performed on-the-fly. In this way, user 155 may automate the configuration of IoT device 130, which may subsequently occur on a certain date, time, and locale. The schedule is made available to other functional components of IoT portal 119 (e.g., IoT management logic 232) so that configurations or updates may be executed according to the scheduled specified by user 155. The schedule may indicate any future date and time. For example, the date and the time may be a date and a time subsequent to user 155 logging off the IoT portal 119.

Referring back to FIG. 1, backhaul network 120 includes one or multiple networks of one or multiple types. According to an exemplary implementation, backhaul network 120 includes a backbone network. For example, the backbone network may be implemented as an optical transport network or other suitable architecture. According to an exemplary implementation, backhaul network 120 provides a connection path to network 115. For example, IoT device 130 may transmit IoT data to data service platform 117 via access network 105 and backhaul network 120 using a NAS control channel. According to an exemplary implementation, when access network 105 is implemented as an LTE RAN or an LTE-A RAN, backhaul network 120 may directly connect to an eNB. According to such an architecture, the IoT data transmitted using the NAS control channel may not traverse network elements of a complimentary part of core network 110.

Location 125 is a geographic locale. Location 125 may be an indoor location, an outdoor location, a public location, a private location, a place of business, and so forth. For example, location 125 may be a retail location (e.g., a shopping mall, a retail store, a grocery store, etc.), a transportation location (e.g., a train station, an airport, a bus station, etc.), an entertainment location (e.g., a movie theater, a museum, a park, a restaurant, a sports stadium, etc.), a business location (e.g., a bank, a hotel, etc.), a parking garage, a hospital, a traffic intersection, a residence, and so forth. IoT device 130 may be installed or situated at location 125.

According to an exemplary embodiment, IoT device 130 includes logic to collect, obtain, and/or generate IoT data as a part of an IoT device service. For example, IoT device 130 may be implemented to include various technologies, such as a sensor, a tag, a camera, an antenna, etc, that collects, obtains, and/or generates IoT data. According to various implementations, IoT device 130 may be a stationary device or a mobile device (e.g., an IoT device 130 attached to a drone, a mobile IoT device, an IoT device embedded or attached to a living organism (e.g., an animal or a person), etc.). IoT device 130 may include a component (e.g., a Global Positioning System (GPS) chipset, etc.) that provides location-aware functionality. IoT device 130 may be powered by an internal source, an external source, a battery, an outlet, electromagnetic waves, and so forth.

According to an exemplary embodiment, IoT device 130 includes a communication interface via which IoT device 130 can transmit and receive data. According to an exemplary embodiment, the communication interface includes an LTE and/or an LTE-A modem (referred to herein as "LTE modem"). The LTE modem transmits and receives data using an LTE NAS control channel as a part of the IoT device service and the IoT data service. According to an exemplary implementation, the LTE NAS control channel can be used to transport small payloads (e.g., 256 bytes or less). For example, IoT device 130 may transmit IoT data to data service platform 117 as a part of an IoT data service and receive data from IoT portal 119 as a part of an IoT management service. As previously described, according to an exemplary implementation, IoT device 130 may transmit IoT data to data service platform 117 via backhaul network 120.

According to other embodiments, the communication interface include one or multiple other wireless communication technologies, such as those described above (e.g., GSM, UMB, WCDMA, etc.), Bluetooth (e.g., Bluetooth Low Energy (BLE), Bluetooth Classic, etc.), Wi-Fi, optical wireless (e.g., Infrared (IR) (e.g., legacy, second generation Infrared), etc.), radio frequency identification (RFID) technology, ZigBee, ZWave, ultra wideband (UWB), low frequency radio frequency (RF), another type of known or future generation communication technology, and/or a wired communication technology. According to other embodiments, the communication interface includes a modem other than the LTE modem and IoT device 130 transmits and receives data using conventional or well-known communication technologies other than the LTE NAS control channel.

IoT device 130 communicates to access network 105, network 115 and, core network 110 and/or backhaul network 120 via the communication interface. IoT device 130 may also communicate with local devices (not illustrated) at location 125 using various short-range communication technologies described herein. For example, IoT device 130 may obtain IoT data from a sensor or a door lock as a part of the IoT device service.

According to an exemplary embodiment, IoT device 130 includes logic that supports the IoT management service. For example, IoT device 130 includes logic to interpret and execute a command, which is received via the communication interface, to perform an operation or a function. IoT device 130 may also include logic that allows for configuring IoT device 130, updating software, etc., based on data received via the communication interface and as a part of the IoT management service.

End device 150 includes a communicative and computational device. End device 150 may be implemented as a mobile device, a portable device, or a stationary device. For example, end device 150 may be implemented as a smartphone, a tablet, a phablet, a netbook, a computer (e.g., a laptop, a desktop, a palmtop, etc.), a personal digital assistant, a terminal, and so forth. According to an exemplary embodiment, end device 150 provides user 155 access to IoT portal 119. For example, end device 150 includes a client, such as a web browser or other suitable software application. User 155 is an operator of end device 150. For example, user 155 may be a network administrator, a third party (e.g., a vendor, a merchant), and so forth. User 155 may use the IoT services provided by the IoT application framework described herein.

Link 160 provides a communication path between network elements, networks, and/or a network element and end device 150. Link 160 may have certain characteristics, such as bandwidth capacity, transmission data rate, and the like.

FIG. 3 is a diagram illustrating exemplary components of a device 300. Device 300 may correspond to each of the network elements and end device depicted in environment 100. As illustrated in FIG. 3, according to an exemplary embodiment, device 300 includes a bus 305, processor 310, memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, and/or clocks.

Processor 310 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/ or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc.

Processor 310 may control the overall operation or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, etc.

Memory/storage 315 includes one or multiple memories and/or one or multiple other types of storage mediums. For example, memory/storage 315 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 315 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 315 may include drives for reading from and writing to the storage medium.

Memory/storage 315 may be external to and/or removable from device 300, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 315 may store data, software, and/or instructions related to the operation of device 300.

Software 320 includes an application or a program that provides a function and/or a process. Software 320 is also intended to include firmware, middleware, microcode, hardware description language (HDL), and/or other form of instruction. By way of example, with respect to the network elements that include logic to provide the IoT device service, the IoT data service, the IoT management service, and the IoT software application development service with respect to the IoT application framework, these network elements may be implemented to include software 320. Additionally, for example, end device 150 may include software 320 (e.g., an application to communicate to IoT portal 119, etc.) to perform tasks as described herein.

Communication interface 325 permits device 300 to communicate with other devices, networks, systems, devices, and/or the like. Communication interface 325 includes one or multiple wireless interfaces and/or wired interfaces. For example, communication interface 325 may include one or multiple transmitters and receivers, or transceivers. Communication interface 325 may include an antenna. Communication interface 325 may operate according to a protocol stack and a communication standard. Communication interface 325 may include various processing logic or circuitry (e.g., multiplexing/de-multiplexing, filtering, amplifying, converting, error correction, etc.). For example, with reference to IoT device 130, the communication interface includes communication interface 325. By way of further example, the LTE modem includes communication interface 325.

Input 330 permits an input into device 300. For example, input 330 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 335 permits an output from device 300. For example, output 335 may include a speaker, a display, a light, an output port, and/or some other type of visual, auditory, tactile, etc., output component. According to some embodiments, input 330 and/or output 335 may be a device that is attachable to and removable from device 300.

Device 300 may perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a process described herein. Alternatively, for example, according to other implementations, device 300 performs a process described herein based on the execution of hardware (processor 310, etc.).

Figure 4A:
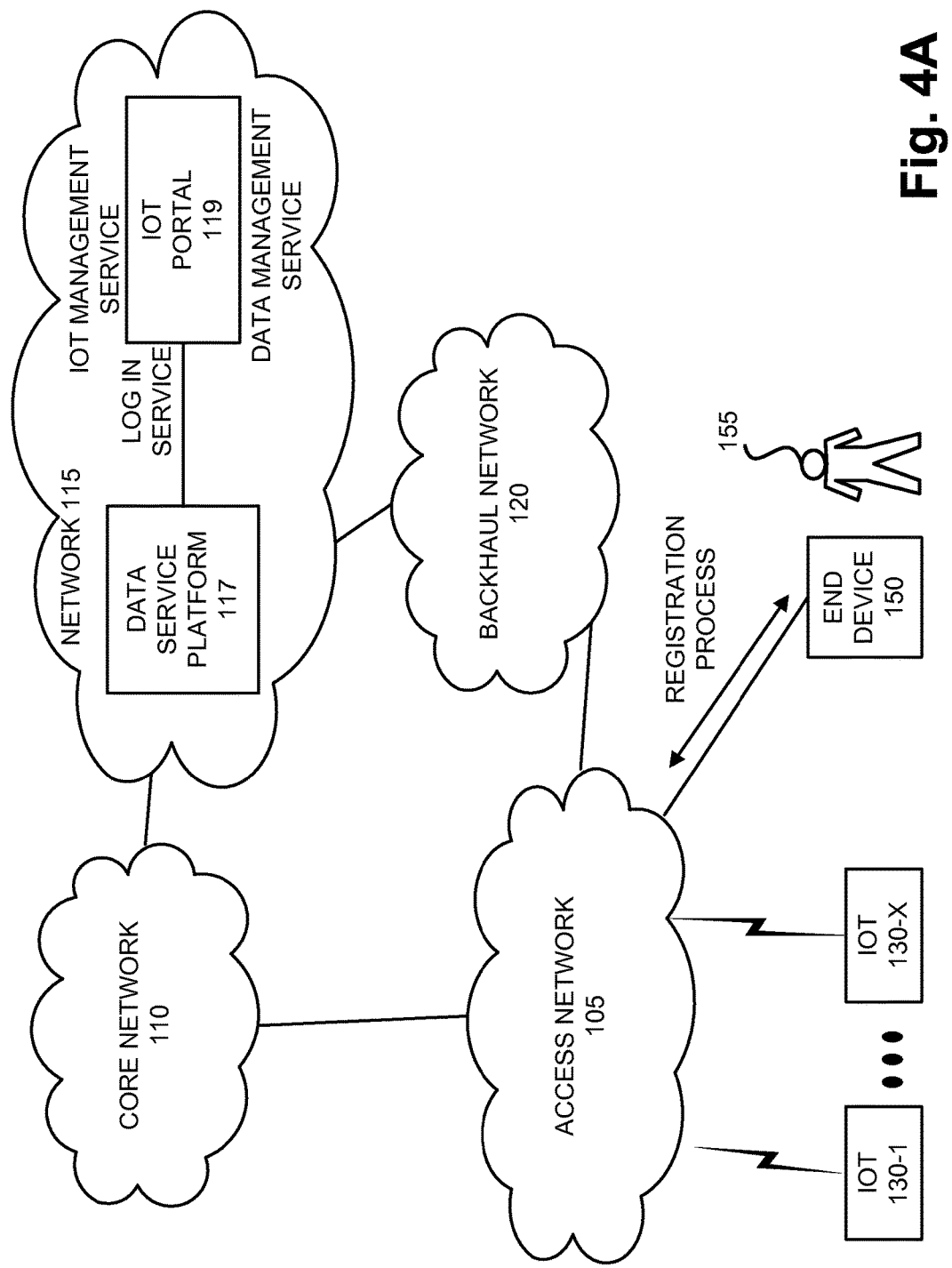
FIGS. 4A-4C are diagrams that illustrate exemplary processes pertaining to an exemplary embodiment of the IoT software application development service in view of an exemplary scenario.
Figure 4B:
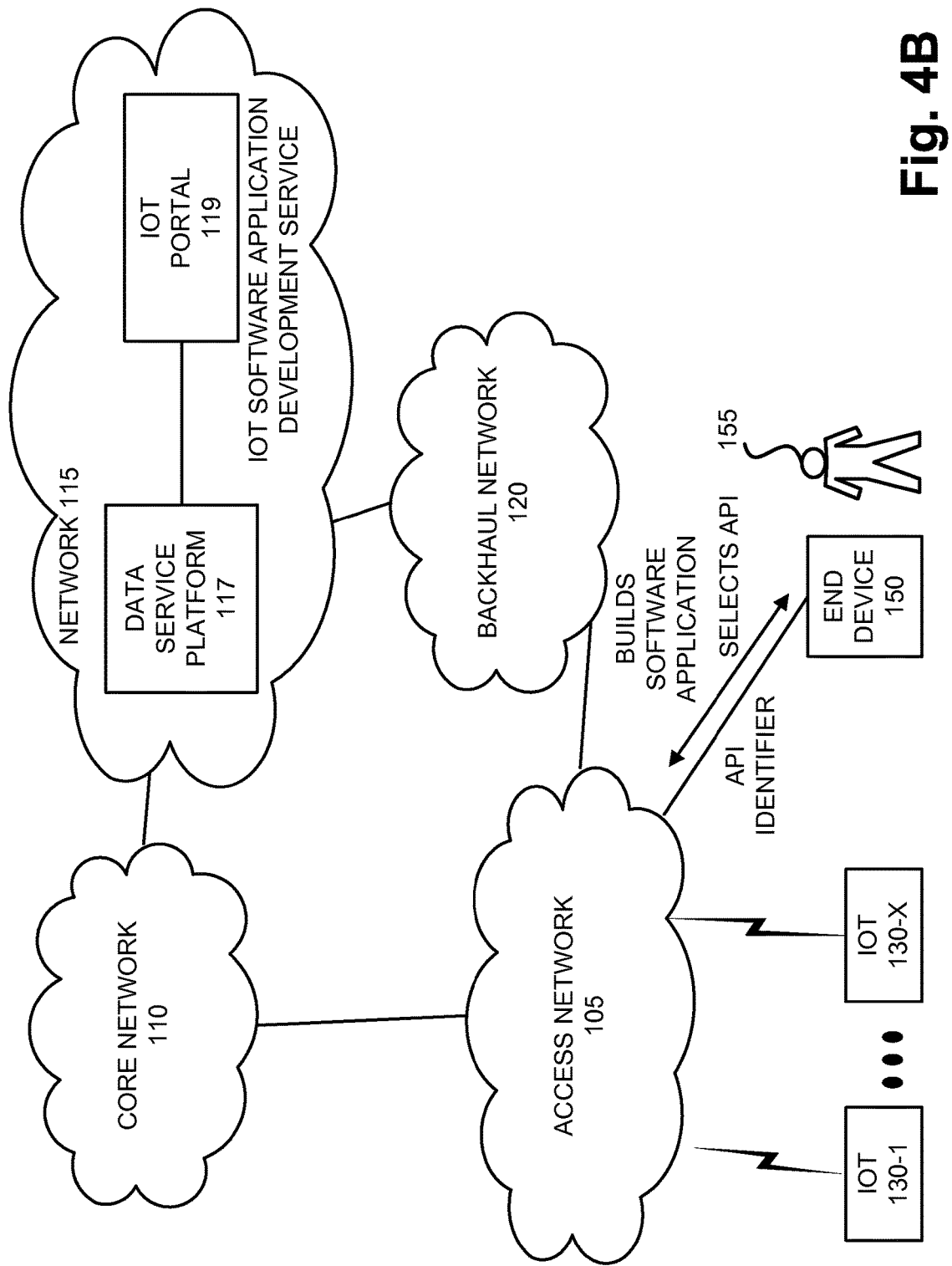
Figure 4C:
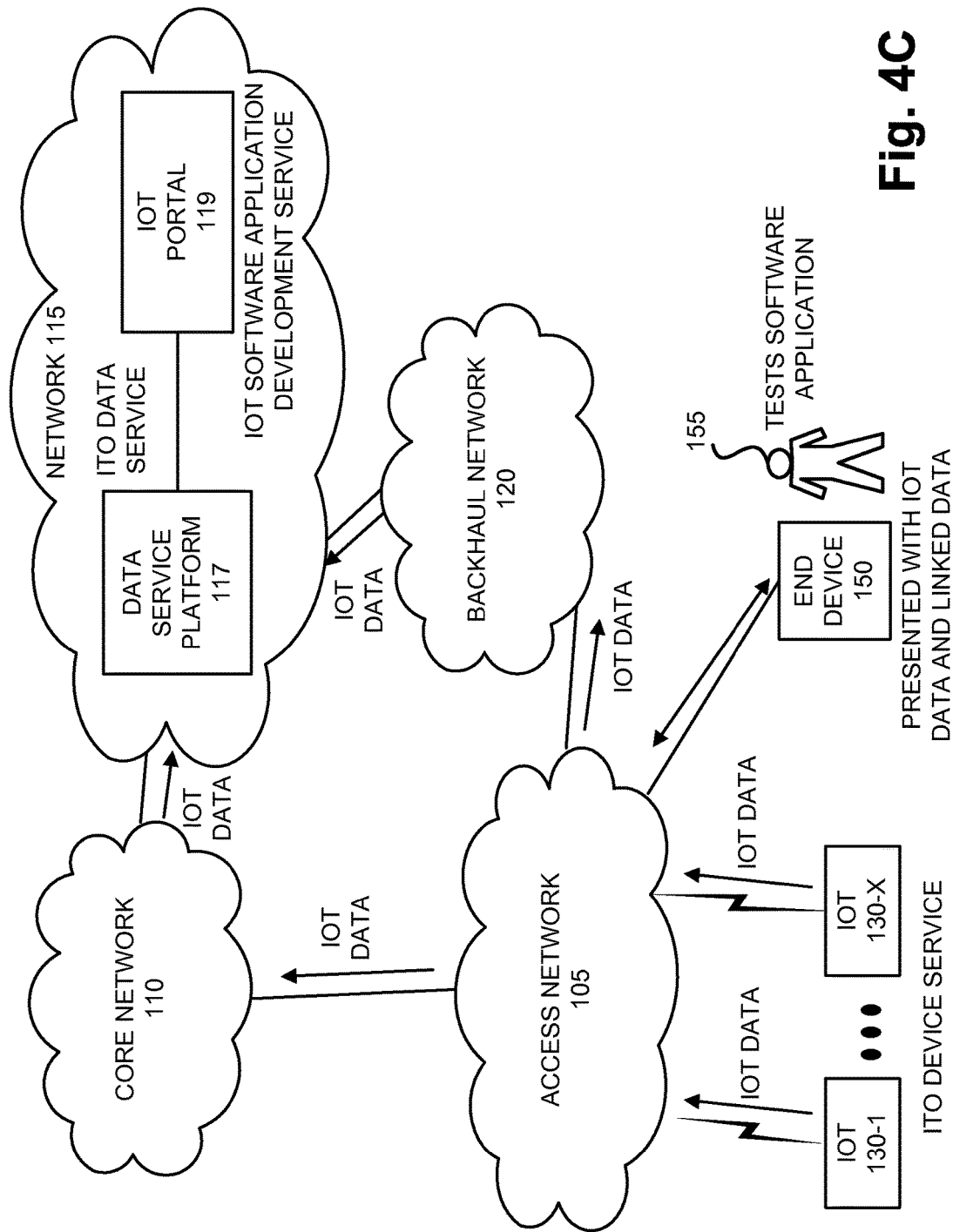

FIGS. 4A-4C are diagrams that illustrate exemplary processes pertaining to the IoT application framework. Referring to FIG. 4A, user 155 registers with IoT portal 119 via the log in service. For example, user 155 provides user credentials via a graphical user interface, which are stored by log in logic 230 in a subscriber profile. User 155 also registers IoT devices 130 located at location 125 via a graphical user interface of the IoT management service. For example, user 155 provides inventory data. User 155 also sets preferences pertaining to IoT data and linked data via the data management services. The inventory data and the preferences are also stored in the subscriber profile.

Referring to FIG. 4B, user 155 accesses the IoT software application development service. User 155 may download an SDK to end device 150 or work in the IDE provided by software application development logic 240. User 155 begins building a software application that will use IoT data provided by IoT devices 130 and linked data provided by the IoT data service of data service platform 117. According to an exemplary implementation, during the development of the software application, user 155 is presented via a graphical user interface, various APIs that are available. Subsequent to learning what a portion of the APIs offer and the linking data available, user 155 selects an API to use for the software application. According to one exemplary implementation, in response to selection of the API, an identifier of the API is stored in the subscriber profile. According to other exemplary implementation, an identifier of the API is not stored in the subscriber profile.

Figure 7:
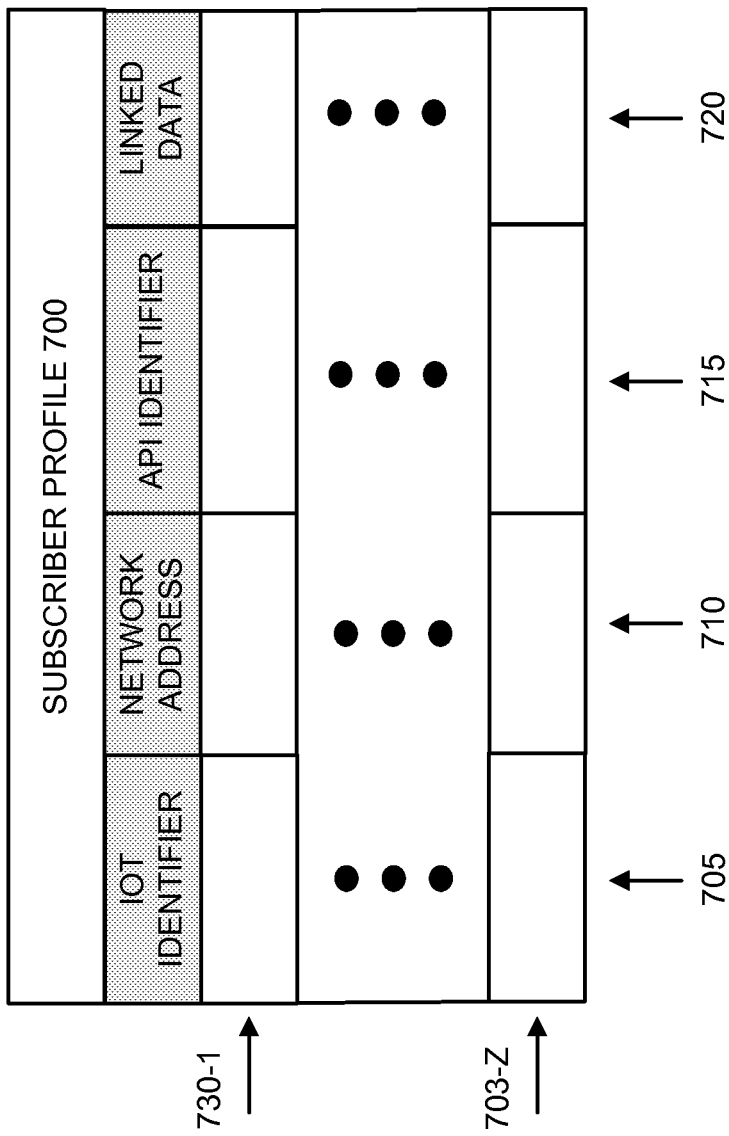
FIG. 7 is a diagram illustrating an exemplary table that stores exemplary subscriber profile information.

Referring to FIG. 4C, for example, either during the software application development or upon completion of the software application, IoT devices 130 begin transmitting IoT data via the communication interface to data service platform 117. According to various implementations, the packets may or may not traverse core network 110. The packets that carry the IoT data are received at data service platform 117 and in response the IoT data service is provided. For example, data inspector 202 identifies that the packets have been transmitted by IoT devices 130 based on various types which may be carried by the packets and a subscriber profile. By way of further example, referring to FIG. 7, data linker 204 may query an exemplary subscriber profile table 700. As illustrated, table 700 includes an IoT identifier field 705, a network address field 710, an API identifier field 715, and a linked data field 720. According to other implementations, subscriber profile table 700 may include additional instances of data, fewer instances of data, and/or different types of data. Table 700 may include subscriber profiles 730-1 through 730-Z (also referred to as subscriber profiles 730 and, individually and/or generically as subscriber profile 730). Each subscriber profile 730 pertains to different users of the IoT application framework and services described herein.

IoT identifier field 705 stores one or multiple unique identifiers pertaining to one or multiple IoT devices 130. The unique identifier of IoT device 130 includes a value that is unique relative to other IoT devices 130. The unique identifier of IoT device 130 may also comprise other sub-values for purposes of identifying a subset of IoT devices 130, etc.

Network address field 710 stores one or multiple network addresses assigned to IoT device 130. According to some implementations, the network address may be a static address (e.g., IPv6 address). According to other implementations, the network address may be dynamic.

API identifier field 715 stores a unique identifier that indicates an API offered via the IoT software application development service. For example, depending on the API used by user 155 for a software application, API identifier field 715 stores a corresponding API identifier.

Linked data field 720 stores data pertaining to the linked data in correspondence to the API/API identifier. For example, according to one exemplary implementation, linked data field 720 may indicate one or multiple types of linked data. Additionally, or alternatively, linked data field 720 may store a user-specified URI of a data source from which to obtain the linked data. Additionally, or alternatively, linked data field 720 may store URIs of data sources 220 from which to obtain the linked data corresponding to the API/API identifier.

Referring back to FIG. 4C, according to one exemplary implementation, data inspector 202 identifies that the packets have been transmitted by IoT devices 130 based on various types, such as an IoT identifier and/or a network address store in a subscriber profile (e.g., subscriber profile table 700).

According to an exemplary implementation, data linker 204 selects the type of linked data to obtain based on the subscriber profile (e.g., subscriber profile 700). For example, data linker 204 selects the API identifier included in the subscriber profile and correlated to the IoT identifier and/or the network address of IoT device 130. According to other exemplary implementations, data linker 204 and the API identifier are not used. Subsequently, data retriever 206 obtains the linked data from data sources 220 and the linked data and the IoT data is stored in a repository. Assume, while the IoT data service is performed, user 155 executes the software application for testing purposes, and during execution of the software application, user 155 is presented with the IoT data and the linked data. For example, the API provides access to and use of the IoT data and the linked data stored in the repository. After successfully testing the software application, user 155 decides to deploy the software application. For example, user 155 may deploy the software application on a web server. Additionally, or alternatively, user 155 may deploy the software application on a web server for download by end users via end user devices (e.g., smart phones, tablets, etc.). When the software application is executed, the API may obtain the IoT data, the linked data, and/or the aggregated data via data service platform 117.

Although FIGS. 4A-4C illustrate exemplary processes pertaining to the IoT application framework, according to other embodiments and/or scenarios, a process may include additional operations, fewer operations, and/or different operations than those illustrated and described.

Figure 5:
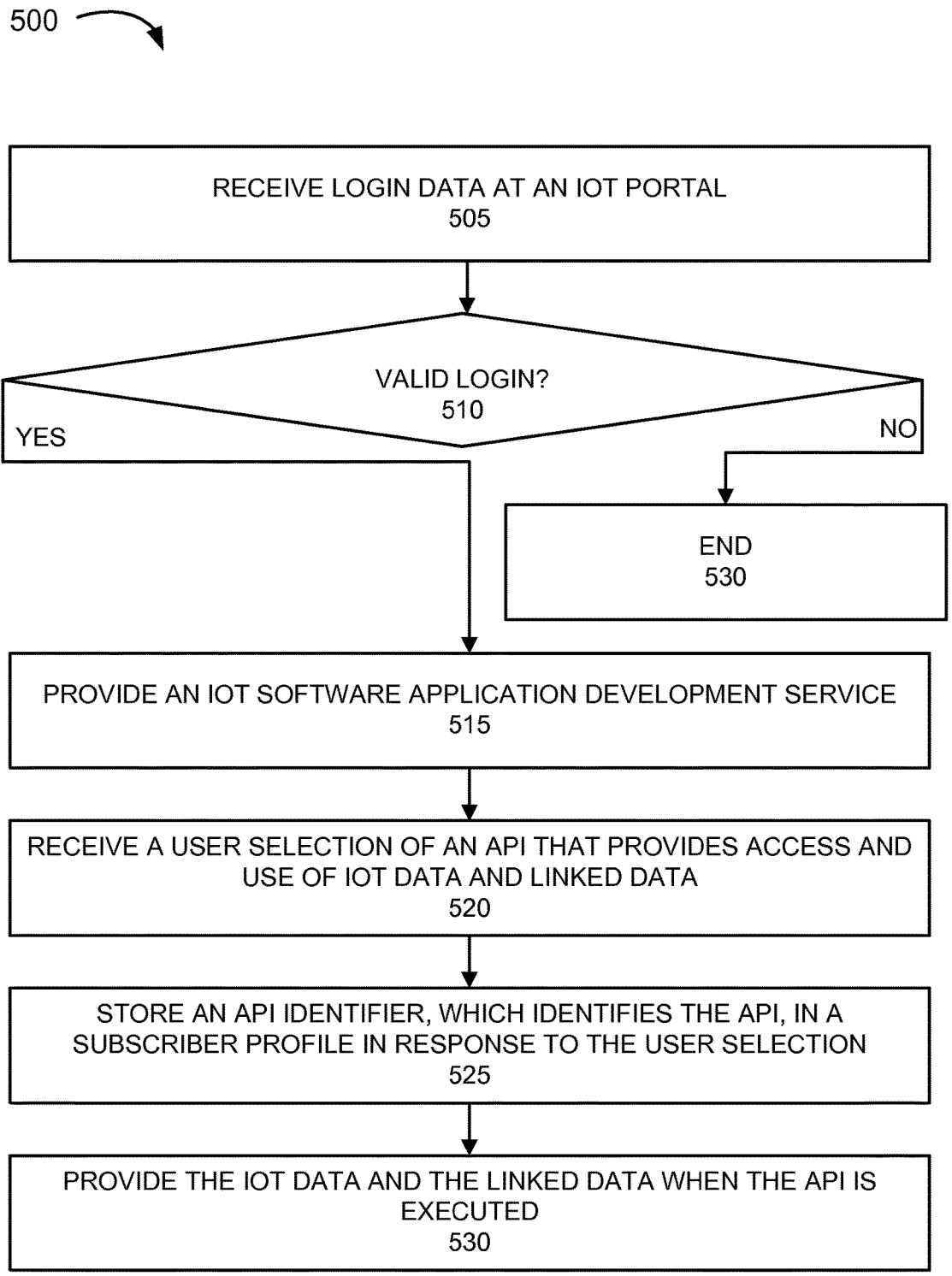
FIG. 5 is a flow diagram illustrating an exemplary process pertaining to an exemplary embodiment of the IoT software application development service of the IoT application framework.

FIG. 5 is a flow diagram illustrating an exemplary process 500 pertaining to the IoT software application development service of the IoT application framework. Process 500 is directed to processes previously described with respect to FIGS. 2B, 4B, and 4C, and elsewhere in this detailed description, in which services of the IoT application framework are described. According to an exemplary embodiment, IoT portal 119 performs steps of process 500. For example, processor 310 executes software 320 to perform the steps described.

Referring to FIG. 5, in block 505, process 500 may begin with receiving login data at an IoT portal. For example, user 155 may access IoT portal 119 via end device 150. Log in logic 230 of IoT portal 119 provides a graphical user interface that allows user 155 to sign into the services of the IoT application framework. User 155 enters user credentials (e.g., a user name and password) via the graphical user interface.

In block 510, it is determined whether the login data is valid. For example, IoT portal 119 determines whether the login data is valid based on a comparison of the login data to registered login data previously stored. When it is determined that the login data is valid (block 510—YES), an IoT software application development service is provided (block 515). For example, subsequent to logging in, user 155 may navigate through a graphical user interface which brings user 155 the IoT software application development service provided by software application development logic 240. The IoT software application development service provides SDKs and/or APIs pertaining to IoT data and the data linking service. For example, user 155 may access a graphical user interface that presents different APIs available for selection. According to one exemplary implementation, the APIs may be categorized according to the type of IoT devices 130, a service to be provided by the software application (e.g., a real-time traffic service, etc.), or some other criterion. The APIs may provide access and use of the IoT data, the linked data, and/or the aggregated data. The APIs may also provide offer access to functions that use the IoT data, the linked data, and/or the aggregated data as arguments so as to provide a given output.

In block 520, a user selection of an API that provides access and use of IoT data and linked data is received. For example, user 155 may select an API to use or be included in the software application being developed so that IoT data and linked data may be obtained for use.

In block 525, an API identifier, which identifies the API, is stored in a subscriber profile. For example, the API identifier is stored in a subscriber profile (e.g., subscriber profile table 700) pertaining to the user.

In block 530, the IoT data and the linked data is provided when the API is invoked. For example, based on the IoT data service and the API identifier, the IoT data and the linked data are available to the software application via the selected API. The IoT data and the linked data may be stored in data service platform 117 (e.g., in a repository).

When it is determined that the login data is not valid (block 510—NO), process 500 may end (block 530). For example, user 155 may be denied access to IoT portal 119.

Although FIG. 5 illustrates an exemplary process pertaining to the IoT software application development service of the IoT application framework, according to other embodiments, process 500 may include additional operations, fewer operations, and/or different operations than those illustrated in FIG. 5, and as described herein.

Figure 6:
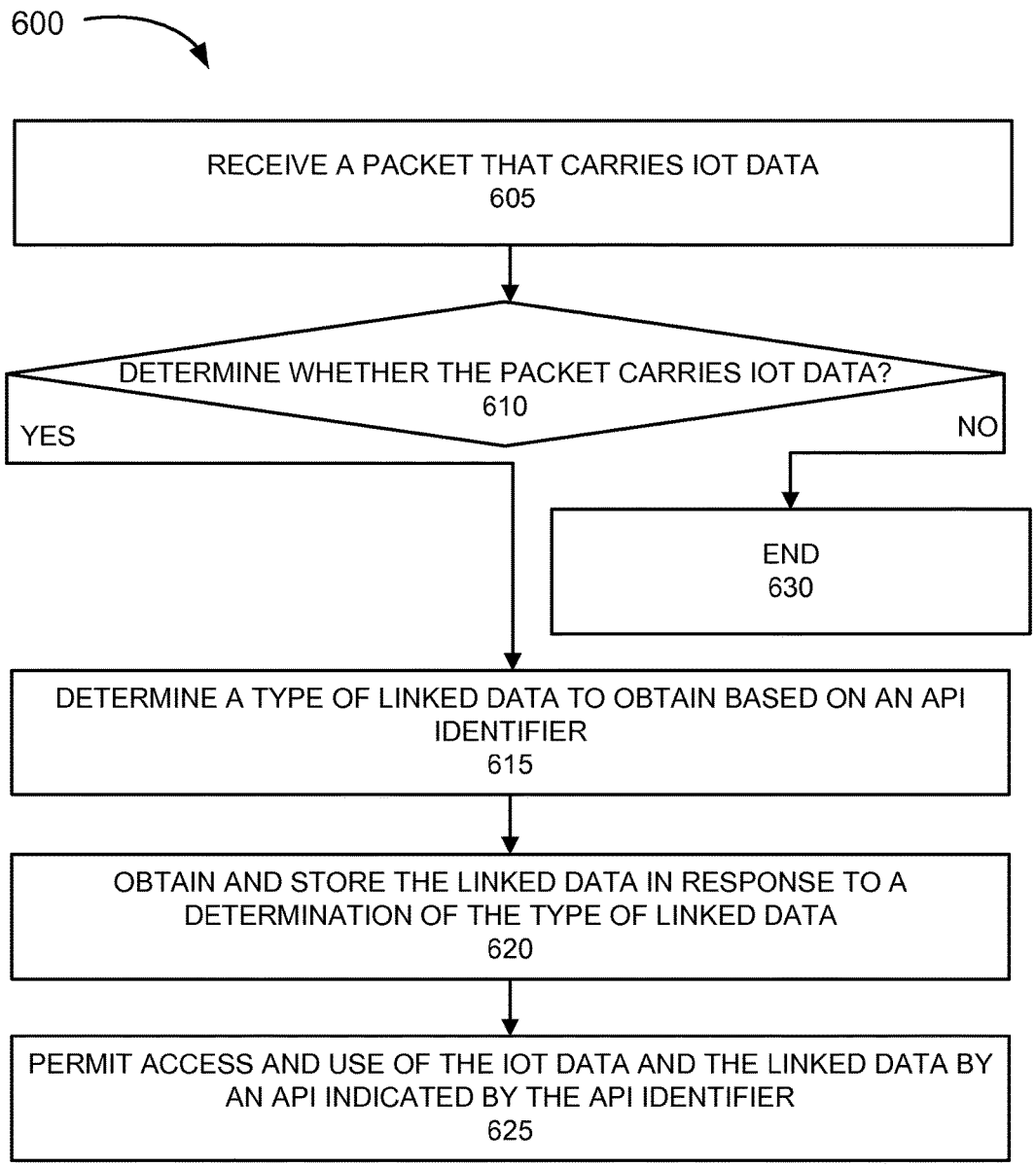
FIG. 6 is a flow diagram illustrating an exemplary process pertaining to an exemplary embodiment of the IoT data service of the IoT application framework.

FIG. 6 is a flow diagram illustrating an exemplary process 600 pertaining to the IoT data service of the IoT application framework. Process 600 is directed to a process previously described with respect to FIGS. 2A and 4C, and elsewhere in this detailed description, in which the IoT data service is described. According to an exemplary embodiment, data service platform 117 performs steps of process 600. For example, processor 310 executes software 320 to perform the steps described.

Referring to FIG. 6, in block 605, a packet that carries IoT data is received. For example, data inspector 202 receives the packet from IoT device 130. In block 610, it is determined whether the packet carries IoT data. For example, data inspector 202 performs a packet filtering process or a DPI process pertaining to the packet. Data inspector 202 identifies the source network address that is carried in the packet. Data inspector 202 may inspect the payload of the packet and determine that the payload carries IoT data. Data inspector 202 may access a database that stores subscription profiles pertaining to the IoT data service. A subscription profile may include a static or a dynamic source network address (e.g., an IP address) assigned to a particular IoT device 130. Data inspector 202 may query the database based on the identified source network address to determine that the packet pertains to the particular IoT device 130.

When it is determined that the packet carries IoT data (block 610—YES), a type of linked data to obtain is determined based on an API identifier (block 615). For example, data linker 204 and/or data retriever 206 identifies an API identifier stored in the subscriber profile. Based on the API identifier, data service platform 117 determines the type of linked data to obtain. As an example, assume that the IoT data does not include a location of IoT device 130 and the type of linked data includes the location of IoT device 130.

In block 620, the linked data is obtained and stored in response to a determination of the type of linked data. For example, data retriever 206 obtains the linked data from data sources 220 and data aggregator 208 stores the linked data and the IoT data (e.g., aggregated data 222) in a repository.

In block 625, access and use of the IoT data and the linked data is permitted by an API indicated by the API identifier. For example, aggregated data 222 is made available to the API of a software application for use. By way of further example, data service platform 117 may receive a request from the software application that includes the API to obtain the IoT data and the linked data. In response, data aggregator 208 may provide access to and use of aggregated data 222 stored in the repository to the requesting API.

When it is determined that the packet does not carry IoT data (block 510—NO), process 600 may end (block 630). For example, IoT device 130 may transmit a packet pertaining to the IoT management service that does not carry IoT data. In such cases, the IoT data service may not obtain linked data.

Although FIG. 6 illustrates an exemplary process pertaining to the IoT data service of the IoT application framework, according to other embodiments, process 600 may include additional operations, fewer operations, and/or different operations than those illustrated in FIG. 6, and as described herein. For example, depending on the type of linked data, the linked data may be continuously obtained and updated regardless of whether data service platform 117 receives packets carrying IoT data. For example, linked data, such as weather information, may be continuously obtained and updated in a repository that stores the linked data. This type of linked data may be made available to particular APIs.

Additionally, or alternatively, the IoT data service may obtain and update all linked data that is available via all of the APIs of the IoT software application development service regardless of whether packets carrying IoT data are received, etc. That is, the IoT data service may not necessarily obtain the linked data in response to receiving packets carrying IoT data, identifying that the packets carry IoT data, and so forth.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The term "exemplary," as used herein means "serving as an example." Any embodiment or implementation described as "exemplary" is not necessarily to be construed as preferred or advantageous over other embodiments or implementations.

In addition, while a series of blocks has been described with regard to the process illustrated in FIGS. 5 and 6, the order of the blocks may be modified according to other embodiments. Further, non-dependent blocks may be performed in parallel or simultaneously. For example, according to an exemplary implementation, two or more operations may be performed using parallel processing or a multitasking procedure. Additionally, other processes described in this description may be modified and/or non-dependent operations may be performed in parallel or simultaneously.

The embodiments described herein may be implemented in many different forms of software executed by hardware. For example, a process or a function may be implemented as "logic" or as a "component." The logic or the component may include, for example, hardware (e.g., processor 310, a sensor, etc.), or a combination of hardware and software (e.g., software 320). The embodiments have been described without reference to the specific software code since the software code can be designed to implement the embodiments based on the description herein and commercially available software design environments/languages.

In the preceding specification, various embodiments have been described with reference to the accompanying drawings. However, various modifications and changes may be made thereto, and additional embodiments may be implemented, without departing from the broader scope of the invention as set forth in the claims that follow and various obvious modifications and equivalent arrangements. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

Additionally, embodiments described herein may be implemented as a non-transitory storage medium that stores data and/or information, such as instructions, program code, a computer program, software, a software application, a data structure, a program module, an application, machine code, a file that can be executed using an interpreter, etc. The program code, instructions, application, etc., is readable and executable by a processor (e.g., processor 310) of a computational device. A non-transitory storage medium includes one or more of the storage mediums described in relation to memory/storage 315.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

The term "packet," as used herein, is intended to be broadly interpreted to include a data transmission or communication, the packaging of which may correspond to, for example, a packet, a cell, a frame, a datagram, some other type of container or unit of data, and/or a fragment thereof.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction described in the present application should be construed as critical or essential to the embodiments described herein unless explicitly described as such.

What is claimed is:

1. A method comprising:
   receiving, by a network device, a packet from an Internet of Things (IoT) device, wherein the packet carries IoT data;
   determining, by the network device, whether the packet carries IoT data;
   determining, by the network device, a type of linked data to obtain in response to determining that the packet carries the IoT data, wherein determining the type of linked data is based on an application programming interface (API) identifier that identifies an API and corresponding type of linked data;
   obtaining, by the network device, the type of linked data in response to determining the type of linked data;
   storing, by the network device, the type of linked data and the IoT data; and
   granting access and use, by the network device, of the type of linked data and the IoT data to the API of a software application, when the software application is executed.

2. The method of claim 1, wherein determining the type of linked data comprises:
   determining a source network address of the IoT device, which is included in the packet; and
   selecting a subscriber profile that includes the API identifier in response to determining the source network address.

3. The method of claim 1, wherein determining the type of linked data comprises:
   determining a device identifier of the IoT device, which is included in the packet; and
   selecting a subscriber profile that includes the API identifier in response to determining the device identifier.

4. The method of claim 1, further comprising:
   providing, by the network device, a software application development service that includes APIs for selection and use by users;
   receiving, by the network device, a selection of one of the APIs, wherein the one of the APIs is the API; and storing, by the network device, the API identifier of the API in a subscriber profile pertaining to one of the users.

5. The method of claim 1, wherein the IoT data does not include a location of the IoT device, and wherein the type of linked data includes the location of the IoT device.

6. The method of claim 1, further comprising:
receiving, by the network device, a request, from an executed software application that includes the API, for the type of linked data and the IoT data; and
providing, by the network device, the type of linked data and the IoT data in response to receiving the request.

7. The method of claim 1, wherein the linked data includes user account information pertaining to one or more users of a mobile phone service.

8. The method of claim 1, wherein the receiving the packet comprises:
receiving the packet via a non-access stratum control channel.

9. A network device comprising:
a communication interface;
a memory, wherein the memory stores instructions; and
a processor, wherein the processor executes the instructions to:
receive, via the communication interface, a packet from an Internet of Things (IoT) device, wherein the packet carries IoT data;
determine whether the packet carries IoT data;
determine a type of linked data to obtain in response to a determination that the packet carries the IoT data, wherein a determination of the type of linked data is based on an application programming interface (API) identifier that identifies an API and corresponding type of linked data;
obtain the type of linked data in response to the determination of the type of linked data;
store the type of linked data and the IoT data; and
grant access and use of the type of linked data and the IoT data to the API of a software application, when the software application is executed.

10. The network device of claim 9, wherein when making the determination of the type of linked data, the processor further executes the instructions to:
determine a source network address of the IoT device, which is included in the packet; and
select a subscriber profile that includes the API identifier in response to a determination of the source network address.

11. The network device of claim 9, wherein when making the determination of the type of linked data, the processor further executes the instructions to:
determine a device identifier of the IoT device, which is included in the packet; and
select a subscriber profile that includes the API identifier in response to a determination of the device identifier.

12. The network device of claim 9, wherein the processor further executes the instructions to:
provide a software application development service that includes APIs for selection and use by users;
receive, via the communication interface, a selection of one of the APIs, wherein the one of the APIs is the API; and
store the API identifier of the API in a subscriber profile pertaining to one of the users.

13. The network device of claim 9, wherein the IoT data does not include a location of the IoT device, and wherein the type of linked data includes the location of the IoT device.

14. The network device of claim 9, wherein the processor further executes the instructions to:
receive, via the communication interface, a request, from an executed software application that includes the API, for the type of linked data and the IoT data; and
provide, via the communication interface, the type of linked data and the IoT data in response to receiving the request.

15. The network device of claim 9, wherein the linked data includes user account information pertaining to one or more users of a mobile phone service.

16. A non-transitory, computer-readable storage medium storing instructions executable by a processor of a computational device, which when executed cause the computational device to:
receive a packet from an Internet of Things (IoT) device, wherein the packet carries IoT data;
determine whether the packet carries IoT data;
determine a type of linked data to obtain in response to a determination that the packet carries the IoT data, wherein a determination of the type of linked data is based on an application programming interface (API) identifier that identifies an API and corresponding type of linked data;
obtain the type of linked data in response to the determination of the type of linked data;
store the type of linked data and the IoT data; and
grant access and use of the type of linked data and the IoT data to the API of a software application, when the software application is executed.

17. The non-transitory, computer-readable storage medium of claim 16, wherein the instructions further comprise instructions to:
determine at least one of a source network address or a device identifier of the IoT device included in the packet; and
select a subscriber profile that includes the API identifier in response to a determination of the at least one of the source network address or the device identifier.

18. The non-transitory, computer-readable storage medium of claim 16, wherein the instructions further comprise instructions to:
provide a software application development service that includes APIs for selection and use by users;
receive a selection of one of the APIs, wherein the one of the APIs is the API; and
store the API identifier of the API in a subscriber profile pertaining to one of the users.

19. The non-transitory, computer-readable storage medium of claim 16, wherein the instructions further comprise instructions to:
receive a request, from an executed software application that includes the API, for the type of linked data and the IoT data; and
provide the type of linked data and the IoT data in response to receiving the request.

20. The non-transitory, computer-readable storage medium of claim 16, wherein the instructions further comprise instructions to:
receive the packet via a non-access stratum control channel.

* * * * *